United States Patent
Rozen et al.

(10) Patent No.: US 8,456,529 B2
(45) Date of Patent: Jun. 4, 2013

(54) DEVICE AND METHOD FOR EVALUATING CONNECTIVITY BETWEEN A VIDEO DRIVER AND A DISPLAY

(75) Inventors: Anton Rozen, Gedera (IL); Shlomo Beer-Gingold, Guivat Shmuel (IL); Michael Zarubinsky, Rishon Lezion (IL)

(73) Assignee: Freescale Semiconductor, Inc., Austin, TX (US)

( * ) Notice: Subject to any disclaimer, the term of this patent is extended or adjusted under 35 U.S.C. 154(b) by 163 days.

(21) Appl. No.: 12/933,243

(22) PCT Filed: Apr. 11, 2008

(86) PCT No.: PCT/IB2008/051386
§ 371 (c)(1),
(2), (4) Date: Sep. 17, 2010

(87) PCT Pub. No.: WO2009/125251
PCT Pub. Date: Oct. 15, 2009

(65) Prior Publication Data
US 2011/0013088 A1     Jan. 20, 2011

(51) Int. Cl.
*H04N 17/00* (2006.01)
*H04N 3/08* (2006.01)

(52) U.S. Cl.
USPC ............................................ 348/180; 348/204

(58) Field of Classification Search
USPC .................. 348/180, 181, 192; 386/252, 255, 386/257; 710/46; 702/122; 714/25
See application file for complete search history.

(56) References Cited

U.S. PATENT DOCUMENTS

| | | | |
|---|---|---|---|
| 5,457,694 A * | 10/1995 | Smith | 714/712 |
| 6,411,330 B1 * | 6/2002 | Purcell et al. | 348/180 |
| 6,541,751 B1 * | 4/2003 | Bidermann | 250/208.1 |
| 6,819,305 B2 | 11/2004 | Wicker | |
| 2002/0005840 A1 * | 1/2002 | Wicker | 345/204 |
| 2004/0054532 A1 * | 3/2004 | Staiger | 704/243 |
| 2005/0078219 A1 * | 4/2005 | Manabe | 348/525 |
| 2006/0181480 A1 * | 8/2006 | Yee | 345/3.1 |
| 2009/0174816 A1 * | 7/2009 | Hellman et al. | 348/553 |
| 2009/0224866 A1 * | 9/2009 | Glen et al. | 340/3.43 |

FOREIGN PATENT DOCUMENTS

EP     0266756 A     5/1988

OTHER PUBLICATIONS

International Search Report and Written Opinion correlating to PCT/IB2008/051386 dated Jan. 13, 2009.

* cited by examiner

*Primary Examiner* — Hai V Tran
*Assistant Examiner* — Akshay Doshi (57) ABSTRACT

A device for evaluating connectivity between a video driver and a display, the device comprises a first video driver, a first output connector, a first terminating resistance; wherein the device is characterized by comprising a first comparison unit; wherein the first video driver has an output port that is coupled to the first output connector, to the first terminating resistance and to the first comparison unit; wherein the first output connector is configured to be coupled via a first cable to a first input of the display; wherein the first comparison unit is adapted to perform comparisons between a voltage level on the first terminating resistance to multiple thresholds and to determine whether a display first input impedance is substantially equal to the first terminating resistance, whether the display first input impedance is substantially lower then the first terminating resistance, or whether the first video driver is disconnected from the display; wherein the comparisons are executed during a pixel information idle period.

20 Claims, 7 Drawing Sheets

First portion 100'(1)

DEVICE AND METHOD FOR EVALUATING CONNECTIVITY BETWEEN A VIDEO DRIVER AND A DISPLAY

FIELD OF THE INVENTION

This invention relates to devices and methods for evaluating connectivity between a video driver and a display.

BACKGROUND OF THE INVENTION

Modern integrated circuits and especially modern systems on chip are expected to include more and more features. One of the most wanted features is multimedia support, especially video playback. Integrated circuits include one or more video drivers that can provide video information to an external (out of the video-player) display, such as TV monitor.

Video playback requires that an external display will be connected to device that includes the integrated chip via one or more (typically three) cables.

Cable detection is used in order to determine whether the display is connected (via one or more cables) to the device or not (connected-disconnected). Some prior art solutions are also characterized by high power consumption.

There is a growing need to provide a device and a method for evaluating connectivity between a display and a video driver.

SUMMARY OF THE INVENTION

The present invention provides a method and a system as described in the accompanying claims. Specific embodiments of the invention are set forth in the dependent claims. These and other aspects of the invention will be apparent from and elucidated with reference to the embodiments described hereinafter.

BRIEF DESCRIPTION OF THE DRAWINGS

Further details, aspects, and embodiments of the invention will be described, by way of example only, with reference to the drawings.

DETAILED DESCRIPTION OF THE PREFERRED EMBODIMENTS

Connectivity between a video driver and a display is evaluated by various systems and methods.

The term 'pixel information' means information that causes a display to show one or more pixels of an image. Information that is sent during vertical or horizontal blanking periods is not regarded as pixel information.

The term 'pixel information idle period' is a period during which no pixel information is expected to be outputted by a video driver. For example, vertical blanking periods and horizontal blanking periods are regarded as pixel information idle periods. A period during which the display is idle or otherwise is not expected to receive new pixel information is also regarded as a pixel information idle period. If, for example, a certain video format requires that a certain video driver will not output pixel information during a certain period than that certain period can be regarded as a pixel information idle period.

A method for evaluating connectivity between a video driver and a display is provided. The method includes: outputting a video signal at an output port of a first video driver; performing, by a first comparison unit and during a pixel information idle period, multiple comparisons between a voltage level on a first terminating resistance to multiple thresholds; and determining whether a display first input impedance is substantially equal to the first terminating resistance, whether the display first input impedance is substantially lower then the first terminating resistance, or whether the first video driver is disconnected from the display; wherein the output port of the video driver is coupled to the first terminating resistance and to a first output connector that is configured to be coupled via a first cable to a first input of the display.

A device for evaluating connectivity between a video driver and a display is provided. The device includes a first video driver, a first output connector, a first terminating resistance and a first comparison unit; wherein the first video driver has an output port that is coupled to the first output connector, to the first terminating resistance and to the first comparison unit; wherein the first output connector is configured to be coupled via a first cable to a first input of the display; wherein the first comparison unit is adapted to perform comparisons between a voltage level on the first terminating resistance to multiple thresholds and to determine whether a display first input impedance is substantially equal to the first terminating resistance, whether the display first input impedance is substantially lower then the first terminating resistance, or whether the first video driver is disconnected from the display; wherein the comparisons are executed during a pixel information idle period.

The display first input impedance is substantially lower then the first terminating resistance if there is a short to the ground, if the cable is shorted or is the first cable was connected to a display connector (such as a audio connector or a earphone connector) that has a low impedance. For example—the impedance of the first terminating resistance can be about 75 Ohms while the display input impedance of an input that is expected be connected to an earphone is about 7 Ohms.

A device is usually connected to a display via multiple cables or is at least is capable of being connected to a multi-input display. Typically, such a device includes three portions, each portion eventually provides video signals via a single output connector. The portion can include, for example, a video driver, a terminating resistance, a comparison unit, and the like. For simplicity of explanation major parts of the following description concentrates on one portion. Typically, the other portions of the device are substantially equal to each other.

Figure 1:
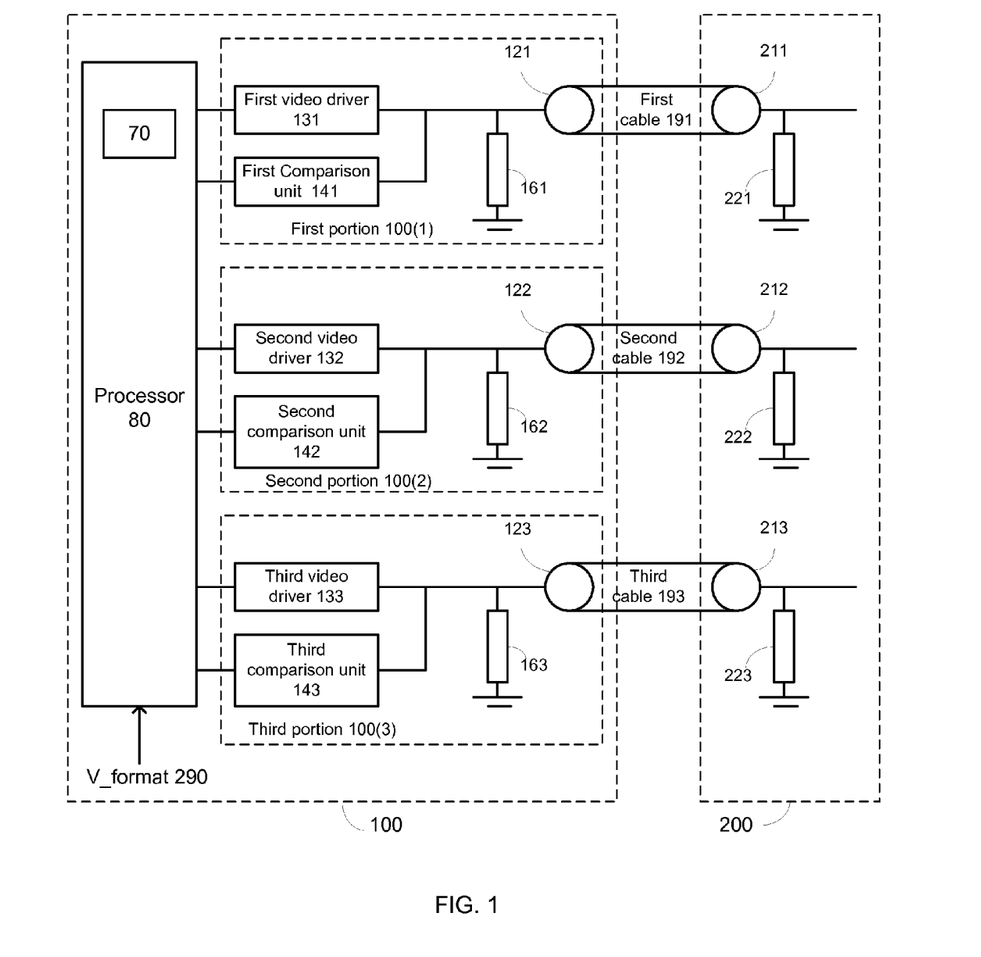
FIG. 1 schematically shows an example of an embodiment of a device for evaluating connectivity between a video driver and a display.

FIG. 1 illustrates device 100 according to an embodiment of the invention.

Device 100 includes three portions 100(1), 100(2) and 100(3). It is noted that device 100 can include more or fewer portions such as portions 100(1), 100(2) and 100(3).

Portion 100(1) is capable of evaluating connectivity between video driver 131 and display 200. Device 100 includes first video driver 131, first output connector 121, first terminating resistance 161, and first comparison unit 141. First video driver 131 has an output port that is coupled to the first output connector 121, to the first terminating resistance 161 and to the first comparison unit 141. The first output connector 121 is configured to be coupled via a first cable 191 to a first input 211 of the display 200. The first comparison unit 141 is adapted to perform comparisons between a voltage level on the first terminating resistance 161 to multiple thresholds and to determine whether display first input impedance 221 is substantially equal to the first terminating resistance 161, whether the display first input impedance 221 is substantially lower then the first terminating resistance 161, or whether the first video driver 131 is disconnected from the display 200. The comparisons are executed during one or more pixel information idle periods. It is noted that more than two thresholds can be provided in order to provide additional information about the connectivity. This information can differ from connected or disconnected indications.

Device 100 may also include processor 80 that can receive information (denoted V_format 290) indicative of a video format to be outputted by one or more video drivers such as but not limited to first video driver 131 and to adjust the multiple thresholds (being used by first comparison unit 141) in response to the video format.

Portions 100(2) and 100(3) may be analogues to portion 100(1). These additional portions include second video driver 132, third video driver 133, second output connector 122, third output connector 123, second terminating resistance 162, third terminating resistance 163, second comparison unit 142, and third comparison unit 143.

Second video driver 132 has an output port that is coupled to the second output connector 122, to the second terminating resistance 162 and to the second comparison unit 142. Second output connector 122 is configured to be coupled via a second cable 192 to a second input 212 of the display 200. Second comparison unit 142 is adapted to perform comparisons between a voltage level on the second terminating resistance 162 to multiple thresholds and to determine whether a display second input impedance 222 is substantially equal to the second terminating resistance 162, whether the display second input impedance 222 is substantially lower then the second terminating resistance 162, or whether the second video driver 132 is disconnected from the display 200. The comparisons are executed during a pixel information idle period.

Third video driver 133 has an output port that is coupled to the third output connector 123, to the third terminating resistance 163 and to the third comparison unit 143. Third output connector 123 is configured to be coupled via a third cable 193 to a third input of the display 200. Third comparison unit 143 is adapted to perform comparisons between a voltage level on the third terminating resistance 163 to multiple thresholds and to determine whether a display third input impedance 223 is substantially equal to the third terminating resistance 163, whether the display third input impedance 223 is substantially lower then the third terminating resistance 163, or whether the third video driver 133 is disconnected from the display 200. The comparisons are executed during a pixel information idle period.

Device 100 can also include television format converter 70. Television format converter 70 can receive information (V_format 290) indicative of a video format of video signals to be outputted by device 100 and especially by one or more of its video drivers (131, 132 and 133) and can adapt the format of video information accordingly. FIG. 1 illustrates television format converter 70 as included within processor 80—in order to represent that processor 80 can perform video format conversions.

According to an embodiment of the invention processor 80 can determine the video format in response to the connectivity between device 100 and display 200. For example, if only a single video driver is properly connected (is not shorted or disconnected) to display 200 than a video format that uses a single cable should be used.

Thus, television format converter 70 is adapted to adapt a format of video outputted by at least one video driver out of the first, second and third video drivers, in response to a determinations of the first, second and third comparison units.

Figure 2:
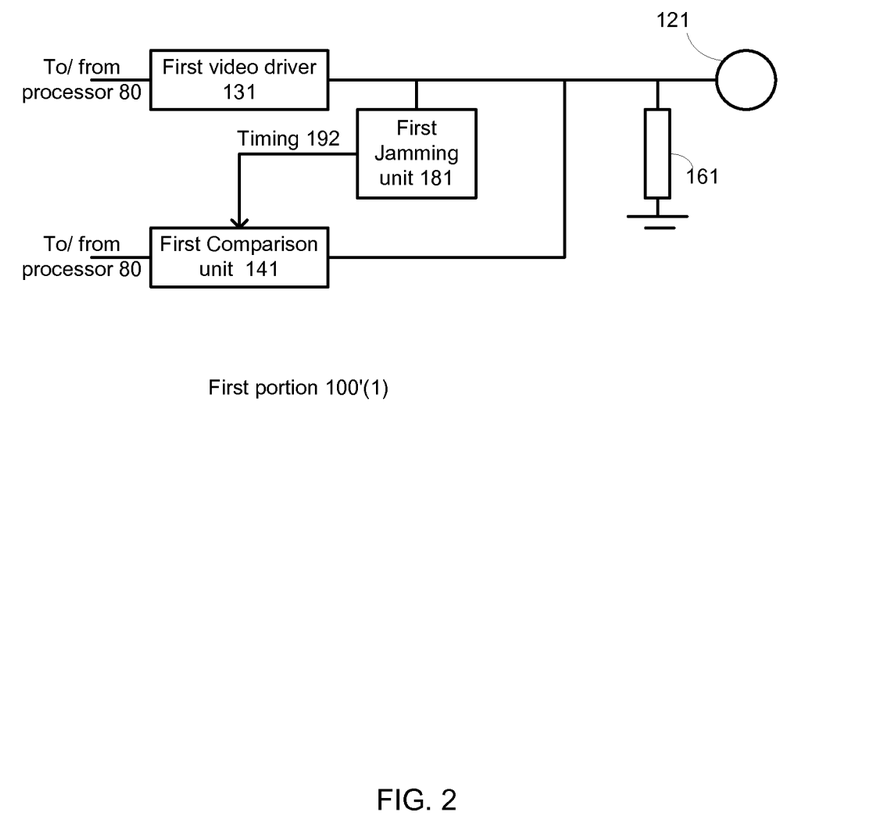
FIG. 2 schematically shows an example of an embodiment of a portion of a device for evaluating connectivity between a video driver and a display.

FIG. 2 illustrates portion 100'(1) of device 100 according to another embodiment of the invention.

Portion 100'(1) differs from portion 100(1) of FIG. 1 by including a first jamming circuit 181. First jamming circuit 181 is adapted to jam video information such that either outputted by first video driver 131 (as illustrated in FIG. 2) or is being provided to first video driver 131 (not illustrated). The video information is jammed in order to prevent video content to be recorded by DVD or VCR devices. First jamming circuit 181 operates in the analog domain although there are jamming circuits (not shown) that can operate in the digital domain.

One prior art jamming circuit is known as the ACP (Analog copying and piracy) of Macrovision Inc. of Santa Clara, Calif., that prevents or distorts copies made over connection between a source player and a DVD recorder, digital video recorder (DVR), PC, or VCR. A DVD disc or a VOD stream protected with ACP triggers an integrated circuit in the playback device, causing it to add the ACP signal to the outgoing video signal.

First jamming circuit 181 jams video information during jamming periods and does not jam video information during jam free periods. The timing (denoted timing 192) of the jam free periods can be provided to first comparison unit 141 or can otherwise be known to processor 80 or another circuit that can determine when to perform the comparisons. For simplicity of explanation FIG. 2 illustrates first jamming circuit 181 as being connected to first comparison unit 141 so as to send timing information (of jam free periods) to first comparison unit 141.

First comparison unit 141 performs the comparisons during an overlap between a jam free period and the pixel information idle period.

Figure 3:
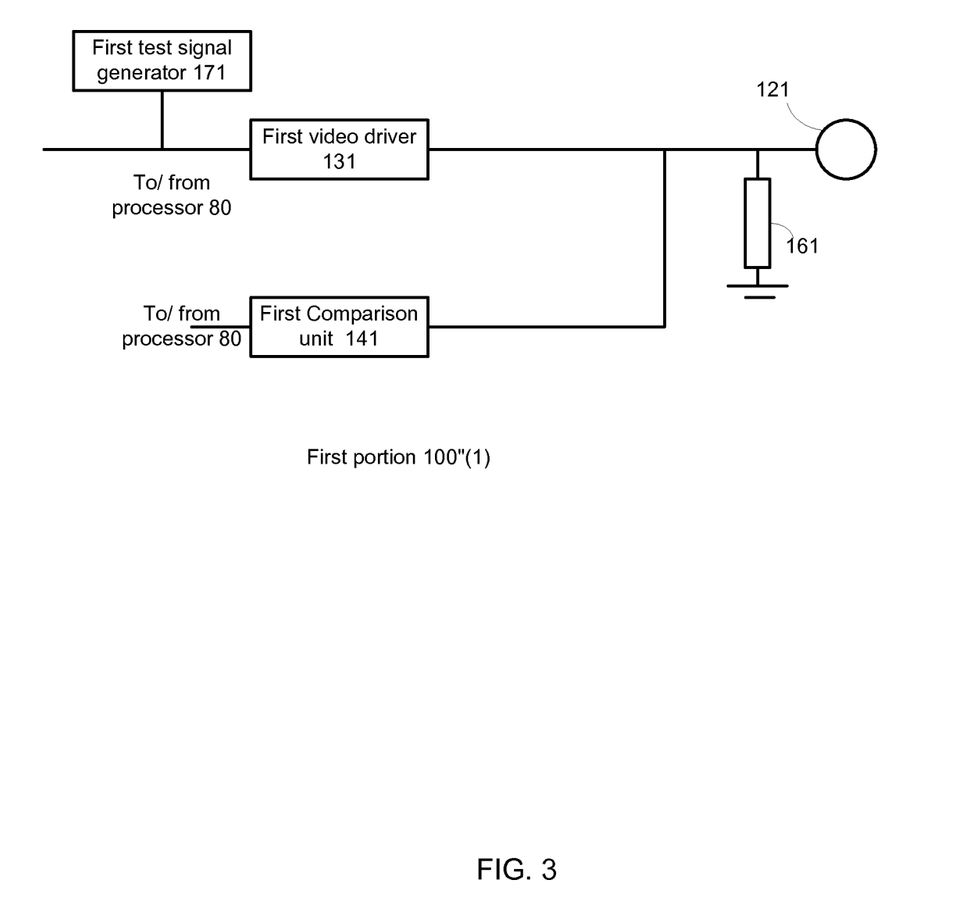
FIG. 3 schematically shows an example of an embodiment of a portion of a device for evaluating connectivity between a video driver and a display.

FIG. 3 illustrates portion 100"(1) of device 100 according to a further embodiment of the invention.

Portion 100"(1) differs from portion 100(1) of FIG. 1 by including first test signal generator 171 that is adapted to send a test signal to the first video driver 131 in order to facilitate comparisons between the voltage level on the first terminating resistance 161 and between the multiple thresholds. The test signal is sent when the display 200 is idle or if the first cable is not expected to convey pixel information. In some standards pixel information is expected to be conveyed over one or two cables out of three cables. The remaining cables are not expected to convey pixel information. It is noted that test signals are generated by test signal generator 171 in response to a testing scheme. The testing scheme can take into account other manners of testing the connectivity between video driver 131 and display 200 such as testing the connectivity based upon video signals of known value that differ from pixel information and are not generated by the test signal generator. Such signals can include, for example, vertical blanking signals (especially vertical synchronization signals). It is noted that various video formats may introduce a predefined offset to a video signal (for example Chroma signal offset of 350 millivolts introduced to SMPTE/EBU compliant signals). This predefined offset can result in a voltage level on first terminating resistance 161 that is responsive to the predefined offset and to the output impedance driven by first video driver 131.

Figure 4:
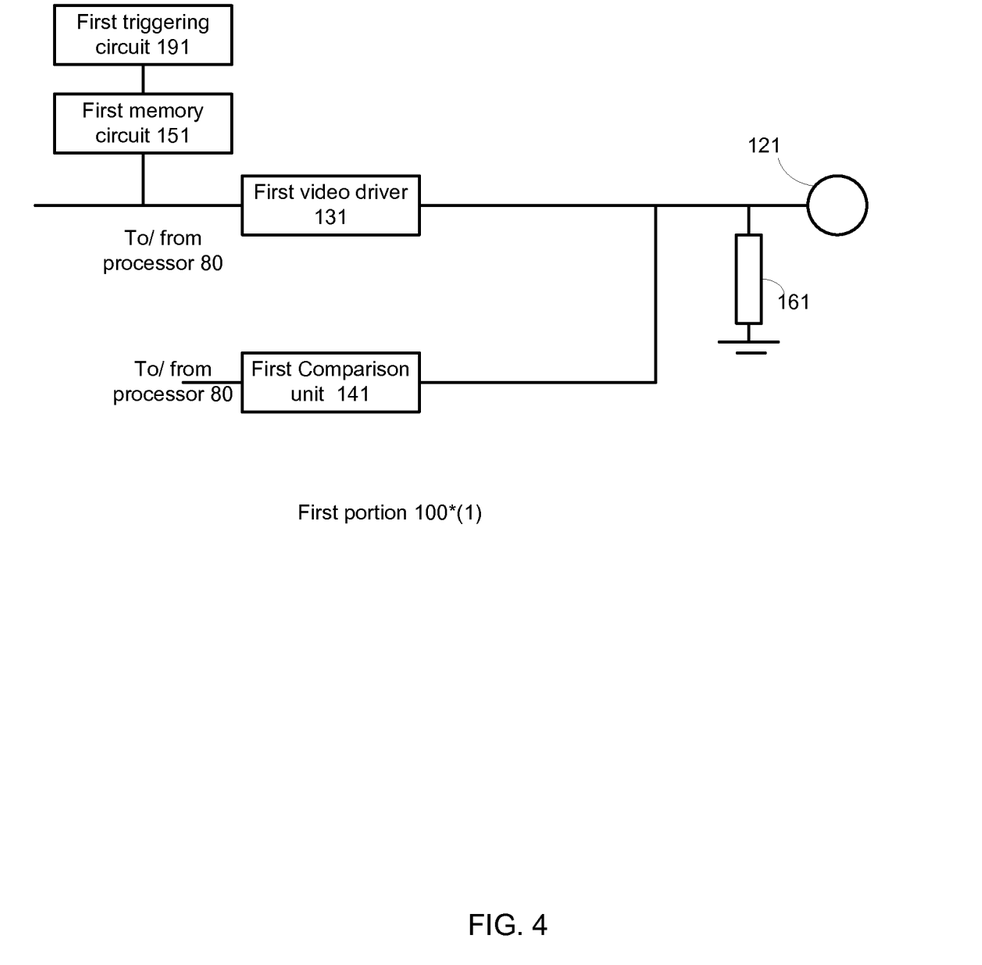
FIG. 4 schematically shows an example of an embodiment of a portion of device for evaluating connectivity between a video driver and a display.

FIG. 4 illustrates portion **100\*(1) of device 100** according to another embodiment of the invention.

Portion **100\*(1) differs from portion 100(1) of FIG. 1 by including low power consuming circuits such as first memory circuit 151 and first triggering circuit 91**.

Device 100 can reduce power consumption. The power reduction is obtained by powering down various high power consuming components such as processor 80 (processor 80 is used to control the generation of test signals) while powering less power consuming circuits such as first memory circuit 151 and first triggering circuit 91. First memory circuit 151 can be a register. It stores a test signal. First triggering circuit 91 triggers the provision of the test signal from first memory circuit 151 to first video driver 131 according to a predefined triggering scheme. It is noted that the test signal can be generated by a test signal generator or can be a video signal of known value that differs from pixel information.

According to this embodiment of the invention processor 80 can be disabled even during the testing the connectivity between device 100 and display 200.

It is noted that power consuming processor 80 can include a general purpose processor that is connected to (or integrated with) one or more digital signal processors.

Figure 5:
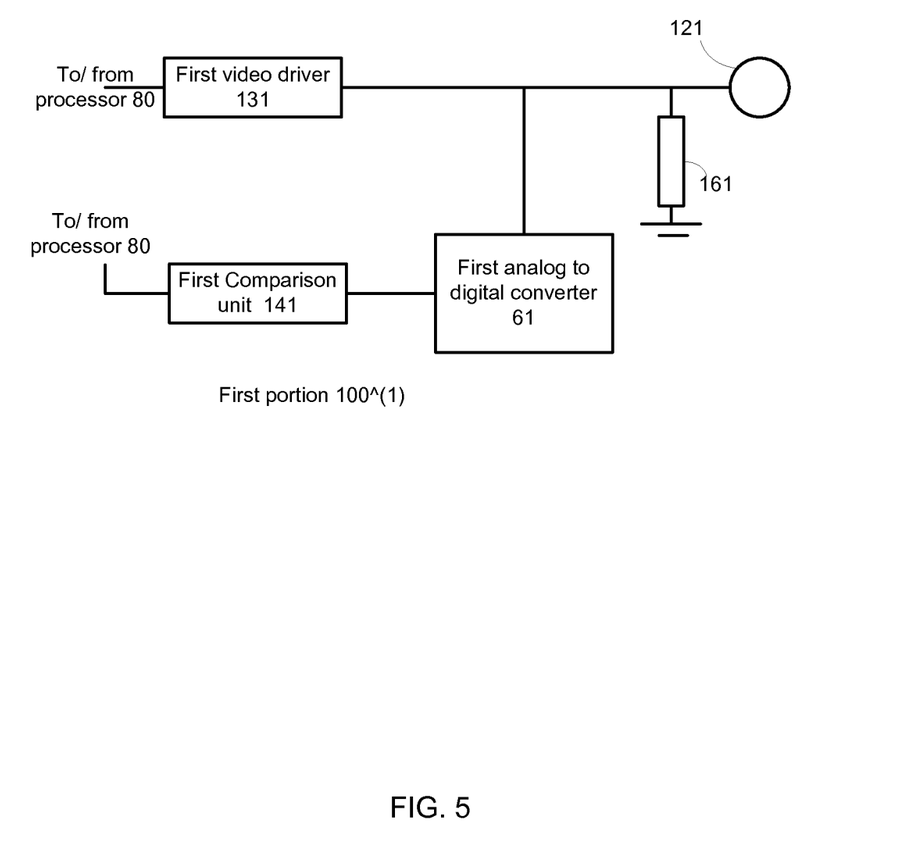
FIG. 5 schematically shows an example of an embodiment of a portion of a device for evaluating connectivity between a video driver and a display.

FIG. 5 illustrates portion 100^(1) of device 100 according to a further embodiment of the invention.

Portion 100^(1) differs from portion 100(1) of FIG. 1 by including first analog to digital converter (ADC) 61 that has an input that is connected to the output port of first video driver 131. First ADC 61 converts an analog signal on first termination resistance 161 to a digital signal that is sent to first comparison circuit 141. First comparison circuit 141 can also receive one or more digital signals that represent multiple voltage thresholds and perform multiple comparisons in the digital domain.

It is noted that according to various embodiments of the invention components of either one of portions 100(1), 100'(1), 100"(1), **100\*(1) and 100^(1) can be combined to each other. Thus, a device can include a first triggering device a first memory circuit and a first jamming circuit 181**. The same applied to second and thirds portions.

It is further noted that processor 80 can receive the results of the comparisons and respond accordingly. The response can include generating an alert (via display or by other means) if the connectivity differs from a desired connectivity, can alter the format of the video according to the connectivity (if fewer than expected cables are properly connected that a video format that requires less cables can be adopted), can determine when to perform the next test, and the like.

Figure 6:
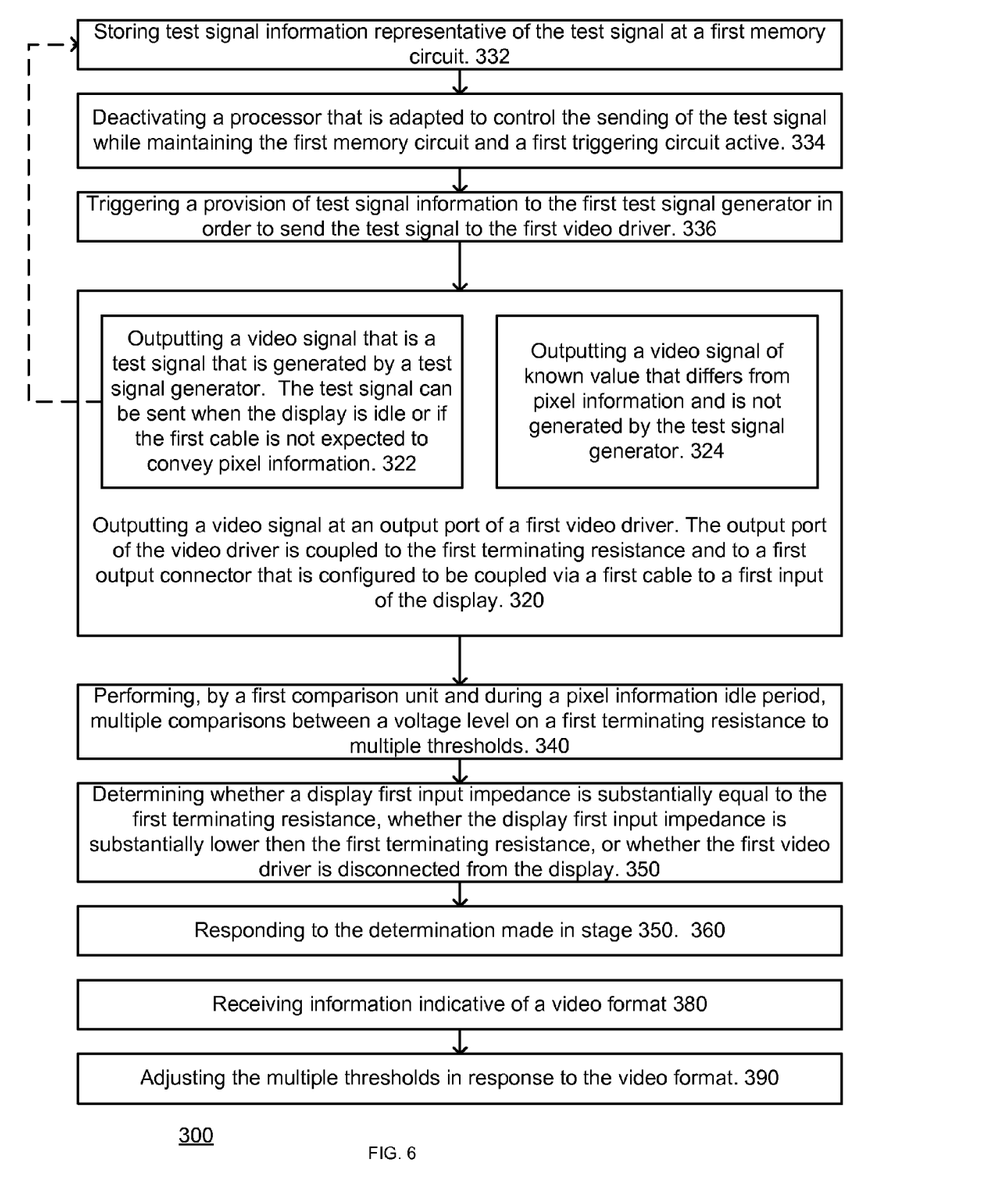
FIG. 6 schematically shows an example of an embodiment of a method for evaluating connectivity between a video driver and a display.

FIG. 6 illustrates method 300 for evaluating connectivity between a video driver and a display, according to an embodiment of the invention.

Method 300 starts by stage 320 of outputting a video signal at an output port of a first video driver. The output port of the video driver is coupled to the first terminating resistance and to a first output connector that is configured to be coupled via a first cable to a first input of the display.

Stage 320 is followed by stage 340 of performing, by a first comparison unit and during a pixel information idle period, multiple comparisons between a voltage levels on a first terminating resistance to multiple thresholds. It is noted that comparisons can be performed in a serial manner, in parallel to each other or by a combination of both. It is further noted that stage 350 can start after one or more comparisons (out of the multiple comparisons) are made.

Stage 340 is followed by stage 350 of determining whether display first input impedance is substantially equal to the first terminating resistance, whether the display first input impedance is substantially lower then the first terminating resistance, or whether the first video driver is disconnected from the display.

Stage 350 may be followed by stage 602 of responding to the comparison. The response can include generating an alert (via display or by other means) if the connectivity differs from a desired connectivity, altering the format of the video according to the connectivity (if fewer than expected cables are properly connected that a video format that requires less cables can be adopted), determine when to perform the next test, and the like.

The pixel information idle period may be at least a portion of a vertical blanking interval.

Method 300 can also include stage 380 of receiving information indicative of a video format and stage 390 of adjusting the multiple thresholds in response to the video format.

According to an embodiment of the invention the video information (digital video information or analog video information) is jammed. The jamming occurs during jamming periods but stops during jam free periods. In this cases stage 340 is executed during one or more overlaps between a jam free period and the pixel information idle period.

According to various embodiment of the invention the comparison can be based upon the injection of test signals, can be based upon video signals of known value that differ from pixel information and are not generated by test signal generator. Such signals can include, for example, vertical blanking signals (especially vertical synchronization signals). It is noted that various video formats may introduce a predefined offset to a video signal (for example Chroma signal offset of 350 millivolts introduced to SMPTE/EBU compliant signals). It is also noted that the comparison can be based upon a combination thereof.

Accordingly, stage 320 can include stage 322 of outputting a video signal that is a test signal that is generated by a test signal generator. The test signal can be sent when the display is idle or if the first cable is not expected to convey pixel information.

One or more iterations of stage 322 can be repeated according to a testing scheme.

Additionally or alternatively, stage 320 can include stage 324 of outputting a video signal of known value that differs from pixel information and is not generated by the test signal generator. According to yet another embodiment of the invention method 300 can contribute to a power consumption reduction. The power reduction is obtained by powering down various high power consuming components such as a processor while powering less power consuming circuits such as a first memory circuit and a first triggering circuit.

This is illustrates by stage 332 of storing test signal information representative of the test signal at a first memory circuit; stage 334 of deactivating a processor that is adapted to control the sending of the test signal while maintaining the first memory circuit and a first triggering circuit active; and stage 336 of triggering a provision of test signal information to the first test signal generator in order to send the test signal to the first video driver.

Figure 7:
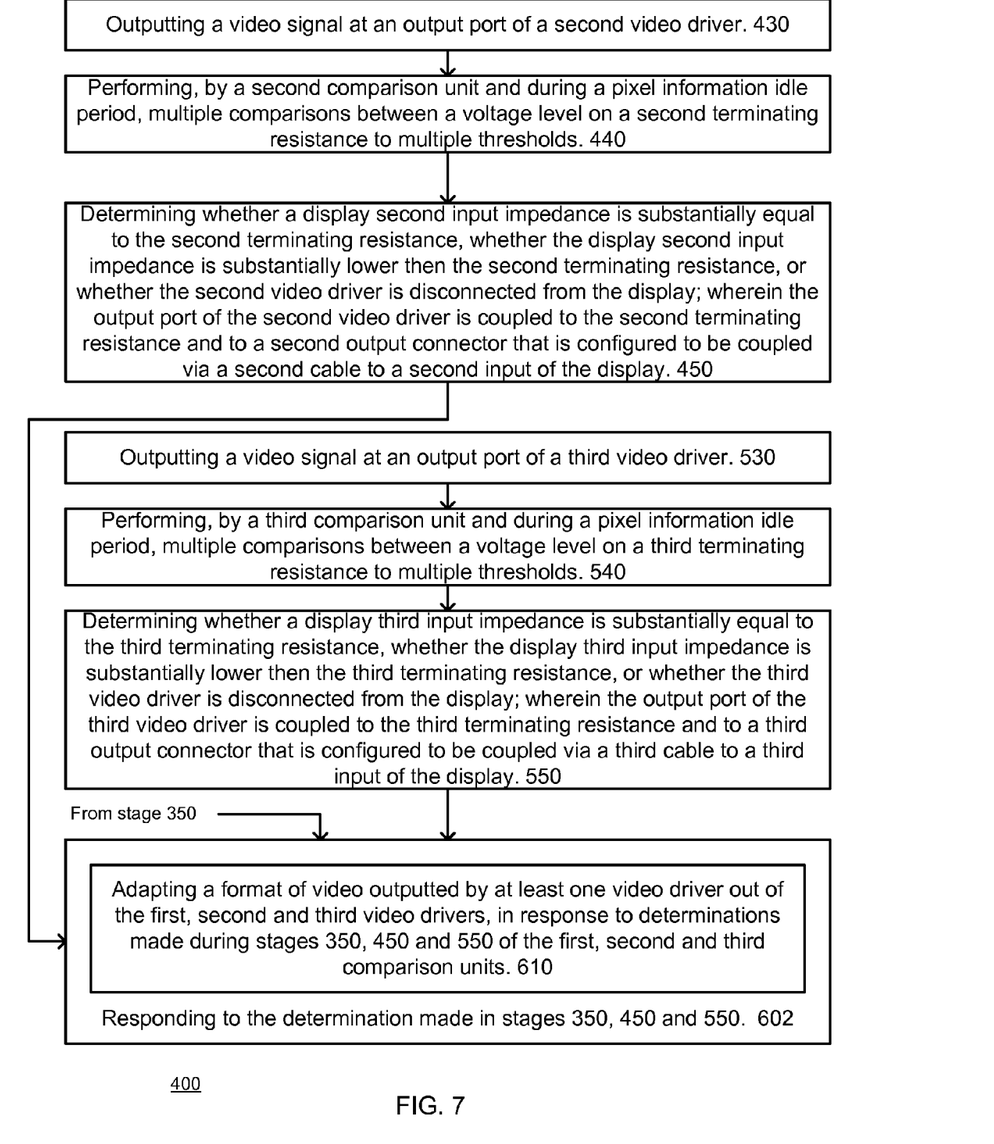
FIG. 7 schematically shows an example of an embodiment of a method for evaluating connectivity between a video driver and a display.

FIG. 7 illustrates method 400 for evaluating connectivity between a video driver and a display, according to an embodiment of the invention.

Method 400 differs from method 300 by including additional stages that are analogues to stages 320, 340 and 350 of FIG. 300.

These stages include: (i) stage 420 of outputting a video signal at an output port of a second video driver; (ii) stage 440 of performing, by a second comparison unit and during a pixel information idle period, multiple comparisons between a voltage level on a second terminating resistance to multiple thresholds; (iii) stage 450 of determining whether a display second input impedance is substantially equal to the second terminating resistance, whether the display second input impedance is substantially lower then the second terminating resistance, or whether the second video driver is disconnected from the display; wherein the output port of the second video driver is coupled to the second terminating resistance and to a second output connector that is configured to be coupled via a second cable to a second input of the display; (iv) stage 520 of outputting a video signal at an output port of a third video driver; (v) stage 540 of performing, by a third comparison unit and during a pixel information idle period, multiple comparisons between a voltage level on a third terminating resistance to multiple thresholds; (vi) stage 550 of determining whether a display third input impedance is substantially equal to the third terminating resistance, whether the display third input impedance is substantially lower then the third terminating resistance, or whether the third video driver is disconnected from the display; wherein the output port of the third video driver is coupled to the third terminating resistance and to a third output connector that is configured to be coupled via a third cable to a third input of the display.

Method 400 may include stage 602 of responding to at least one of the determinations made during stages 350, 450 and 550 of the first, second and third comparison units. Stage 602 can include stage 610 of adapting a format of video outputted by at least one video driver out of the first, second and third video drivers, in response to determinations. Stage 602 can also Multiple iterations of methods 300 or method 400 can be executing according to a testing scheme. The iterations can be repeated in a periodical manner, in a random manner, in a semi-random manner, if a predefined but non-periodical manner, in response to a request, in response to an event or in a combination thereof.

Because the apparatus implementing the present invention is, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

Although the invention has been described with respect to specific conductivity types or polarity of potentials, skilled artisans appreciated that conductivity types and polarities of potentials may be reversed.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

Thus, it is to be understood that the architectures depicted herein are merely exemplary, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the functionality of the above described operations merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

Although the invention is described herein with reference to specific embodiments, various modifications and changes can be made without departing from the scope of the present invention as set forth in the claims below. For example, FIG. 1 illustrates controller as being included in configurable receiver but this is not necessarily so. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

The term "coupled," as used herein, is not intended to be limited to a direct coupling or a mechanical coupling.

In the foregoing specification, the invention has been described with reference to specific examples of embodiments of the invention. It will, however, be evident that various modifications and changes may be made therein without departing from the broader spirit and scope of the invention as set forth in the appended claims. For example, the connections may be any type of connection suitable to transfer signals from or to the respective nodes, units or devices, for example via intermediate devices. Accordingly, unless implied or stated otherwise the connections may for example be direct connections or indirect connections.

Also, devices functionally forming separate devices may be integrated in a single physical device.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the words 'a' and 'an' shall not be construed as limited to 'only one', but instead are used to mean 'at least one', and do not exclude a plurality. The mere fact that certain measures are recited in mutually different claims does not indicate that a combination of these measures cannot be used to advantage.

The invention claimed is:

1. A device for evaluating connectivity between a video driver and a display, the device comprising:
   a first video driver;
   a first output connector;
   a first terminating resistance;
   a first comparison unit; and
   a first jamming circuit configured to produce jam video information either provided to the first video driver or outputted by the first video driver;
   wherein the first video driver has an output port that is coupled to the first output connector, to the first terminating resistance and to the first comparison unit;
   wherein the first output connector is configured to be coupled via a first cable to a first input of the display;
   wherein the first comparison unit is configured to perform comparisons between a voltage level on the first terminating resistance to multiple thresholds and to determine whether a display first input impedance is substantially equal to the first terminating resistance, whether the display first input impedance is substantially lower than the first terminating resistance, and whether the first video driver is disconnected from the display; and
   wherein the first comparison unit performs the comparisons during an overlap between a jam free period and a pixel information idle period;
   wherein the comparisons are executed during the pixel information idle period.

2. The device according to claim 1, wherein the pixel information idle period is at least a portion of a vertical blanking interval.

3. The device according to claim 1, wherein the device is configured to receive information indicative of a video format and to adjust the multiple thresholds in response to the video format.

4. The device according to claim 1, comprising:
   a first test signal generator configured to send a test signal to the first video driver in order to facilitate comparisons between the voltage level on the first terminating resistance and between the multiple thresholds; and
   wherein the test signal is sent when the display is idle or if the first cable is not expected to convey pixel information.

5. The device according to claim 1, wherein:
   the device further comprises a first memory circuit and a first triggering circuit;
   the first memory circuit is configured to store the test signal; and wherein triggering information is configured to trigger a provision of the test signal from the first memory circuit to the first video driver; and
   the first memory circuit and the first triggering circuit are activated when a processor of the device is deactivated.

6. The device according to claim 1 comprising:
   a second video driver, a third video driver, a second output connector, a third output connector, a second terminating resistance ,a third terminating resistance ,a second comparison unit and a third comparison unit;
   wherein the second video driver has an output port that is coupled to the second output connector, to the second terminating resistance and to the second comparison unit;
   wherein the second output connector is configured to be coupled via a second cable to a second input of the display;
   wherein the second comparison unit is configured to perform comparisons between a voltage level on the second terminating resistance to multiple thresholds and to determine whether a display second input impedance is substantially equal to the second terminating resistance, whether the display second input impedance is substantially lower than the second terminating resistance, or whether the second video driver is disconnected from the display;
   wherein the comparisons are executed during a pixel information idle period;
   wherein the third video driver has an output port that is coupled to the third output connector, to the third terminating resistance and to the third comparison unit;
   wherein the third output connector is configured to be coupled via a third cable to a third input of the display;
   wherein the third comparison unit is configured to perform comparisons between a voltage level on the third terminating resistance to multiple thresholds and to determine whether a display third input impedance is substantially equal to the third terminating resistance, whether the display third input impedance is substantially lower than the third terminating resistance, or whether the third video driver is disconnected from the display; and
   wherein the comparisons are executed during a pixel information idle period.

7. The device according to claim 6 comprising a television format converter that is configured to adapt a format of video outputted by at least one video driver out of the first, second and third video drivers, in response to a determinations of the first, second and third comparison units.

8. A method for evaluating connectivity between a video driver and a display, the method comprising:
   outputting a video signal at an output port of a first video driver;
   performing, by a first comparison unit and during a pixel information idle period, multiple comparisons between a voltage level on a first terminating resistance to multiple thresholds;
   determining whether a display first input impedance is substantially equal to the first terminating resistance, whether the display first input impedance is substantially lower than the first terminating resistance, and whether the first video driver is disconnected from the display; and
   performing the multiple comparisons during an overlap between a jam free period and the pixel information idle period; wherein during lamming periods video information is jammed;
   wherein the output port of the video driver is coupled to the first terminating resistance and to a first output connector that is configured to be coupled via a first cable to a first input of the display.

9. The method according to claim 8, comprising receiving information indicative of a video format and adjusting the multiple thresholds in response to the video format.

10. The method according to claim 8, wherein the method further comprises sending, by a test signal generator, a test signal to the first video driver in order to facilitate the performing of the multiple comparisons; wherein the sending occurs when the display is idle or if the first cable is not expected to convey pixel information.

11. The method according to claim 8, comprising: storing the test signal at a first memory circuit; deactivating a processor that is configured to control the sending of the test signal while maintaining the first memory circuit and a first triggering circuit active; triggering a provision of the test signal from the first memory circuit to the first video driver.

12. The method according to claim 8, comprising:
outputting a video signal at an output port of a second video driver;
performing, by a second comparison unit and during a pixel information idle period, multiple comparisons between a voltage level on a second terminating resistance to multiple thresholds;
determining whether a display second input impedance is substantially equal to the second terminating resistance, whether the display second input impedance is substantially lower than the second terminating resistance, or whether the second video driver is disconnected from the display;
wherein the output port of the second video driver is coupled to the second terminating resistance and to a second output connector that is configured to be coupled via a second cable to a second input of the display; outputting a video signal at an output port of a third video driver; performing, by a third comparison unit and during a pixel information idle period, multiple comparisons between a voltage level on a third terminating resistance to multiple thresholds; determining whether a display third input impedance is substantially equal to the third terminating resistance, whether the display third input impedance is substantially lower then the third terminating resistance, or whether the third video driver is disconnected from the display;
wherein the output port of the third video driver is coupled to the third terminating resistance and to a third output connector that is configured to be coupled via a third cable to a third input of the display.

13. The method according to claim 12, comprising adapting a format of video outputted by at least one video driver out of the first, second and third video drivers, in response to determinations of the first, second and third comparison units.

14. An assembly of the device according to claim 1.

15. A method for evaluating connectivity between a video driver and a display, the method comprising:
outputting a video signal at an output port of a first video driver;
performing, by a first comparison unit and during a pixel information idle period, multiple comparisons between a voltage level on a first terminating resistance to multiple thresholds;
determining whether a display first input impedance is substantially equal to the first terminating resistance, whether the display first input impedance is substantially lower than the first terminating resistance, and whether the first video driver is disconnected from the display; and
performing the multiple comparisons during an overlap between a jam free period and the pixel information idle period; wherein during jamming periods video information is jammed;
wherein the output port of the video driver is coupled to the first terminating resistance and to a first output connector that is configured to be coupled via a first cable to a first input of the display, and wherein the pixel information idle period is at least a portion of a vertical blanking interval.

16. The method according to claim 9, wherein the method further comprises sending, by a test signal generator, a test signal to the first video driver in order to facilitate the performing of the multiple comparisons; wherein the sending occurs when the display is idle or if the first cable is not expected to convey pixel information.

17. The method according to claim 8, wherein the method further comprises sending, by a test signal generator, a test signal to the first video driver in order to facilitate the performing of the multiple comparisons; wherein the sending occurs when the display is idle or if the first cable is not expected to convey pixel information.

18. The method according to claim 15, wherein the method further comprises sending, by a test signal generator, a test signal to the first video driver in order to facilitate the performing of the multiple comparisons; wherein the sending occurs when the display is idle or if the first cable is not expected to convey pixel information.

19. The device according to claim 1, wherein the jam video information is provided to the first video driver.

20. The device according to claim 1, wherein the jam video information outputted by the first video driver.

* * * * *